United States Patent
Botes et al.

(10) Patent No.: US 7,459,485 B2
(45) Date of Patent: Dec. 2, 2008

(54) HYDROCARBON SYNTHESIS PROCESS USING A HYDROCARBON SYNTHESIS CATALYST AND AN ACIDIC CATALYST

(75) Inventors: Frederick Gideon Botes, Vanderbijlpark (ZA); Tracy Carolyn Bromfield, Vanderbijlpark (ZA); Philip Gibson, Sasolburg (ZA); Rafael Luis Espinoza, Ponca City, OK (US)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 358 days.

(21) Appl. No.: 10/511,390

(22) PCT Filed: Apr. 15, 2003

(86) PCT No.: PCT/ZA03/00052

§ 371 (c)(1), (2), (4) Date: May 3, 2005

(87) PCT Pub. No.: WO03/087266

PCT Pub. Date: Oct. 23, 2003

(65) Prior Publication Data

US 2005/0227851 A1 Oct. 13, 2005

Related U.S. Application Data

(60) Provisional application No. 60/372,667, filed on Apr. 16, 2002.

(30) Foreign Application Priority Data

Apr. 16, 2002 (ZA) .................................. 02/2986

(51) Int. Cl.
C07C 27/00 (2006.01)
C07C 27/06 (2006.01)

(52) U.S. Cl. .................. 518/700; 518/715; 518/717; 518/718; 518/719; 518/721

(58) Field of Classification Search ................. 518/700, 518/715, 717, 718, 719, 721
See application file for complete search history.

(56) References Cited

U.S. PATENT DOCUMENTS

| | | | |
|---|---|---|---|
| 4,086,262 A | 4/1978 | Chang et al. | |
| 4,172,843 A | 10/1979 | Dwyer et al. | |
| 4,269,783 A | 5/1981 | Brennan et al. | |
| 4,279,830 A | 7/1981 | Haag et al. | |
| 4,289,695 A | 9/1981 | Chou | |
| 4,298,695 A | 11/1981 | Butter et al. | |
| 4,304,871 A * | 12/1981 | Brennan et al. | 518/717 |
| 4,361,503 A * | 11/1982 | Dwyer et al. | 502/74 |
| 4,463,101 A | 7/1984 | Dwyer et al. | |
| 4,556,645 A | 12/1985 | Coughlin et al. | |
| 4,652,538 A | 3/1987 | Rabo et al. | |

FOREIGN PATENT DOCUMENTS

WO    WO 01/97968 A2    12/2001

* cited by examiner

*Primary Examiner*—Elizabeth D Wood
(74) *Attorney, Agent, or Firm*—Finnegan, Henderson, Farabow, Garrett & Dunner, L.L.P.

(57) ABSTRACT

This invention relates to a hydrocarbon synthesis process comprising the conversion of a feed of $H_2$ and at least one carbon oxide to hydrocarbons containing at least 30% on a mass basis hydrocarbons with five or more carbon atoms. The conversion is carried out in the presence of an alkali-promoted iron hydrocarbon synthesis catalyst and an acidic catalyst suitable for converting hydrocarbons. The reaction mixture formed during the conversion contains less than 0.02 mol alkali per 100 g iron and the $H_2$:carbon oxide molar ration in the feed of $H_2$ and carbon oxide is at least 2.

8 Claims, No Drawings

HYDROCARBON SYNTHESIS PROCESS USING A HYDROCARBON SYNTHESIS CATALYST AND AN ACIDIC CATALYST

CROSS REFERENCE TO RELATED APPLICATIONS

This application is a National Phase application based on PCT/ZA03/00052, filed on Apr. 15, 2003, the contents of which are incorporated herein by reference and claims the priority of South African Application No. 02/2986, filed on Apr. 16, 2002, and claims the benefit of U.S. Provisional Application No. 60/372,667, filed on Apr. 16, 2002, the contents of each of which are incorporated herein by reference.

TECHNICAL FIELD

This invention relates to a hydrocarbon synthesis process and more particularly to such a process wherein a hydrocarbon synthesis catalyst and an acidic catalyst is used. The process is particularly, but not exclusively, suitable for producing liquid fuel. The process is also suitable for producing hydrocarbons rich in aromatics such as benzene, toluene and xylenes or hydrocarbons rich in branched hydrocarbons or rich in olefins.

BACKGROUND ART

Fischer-Tropsch processes for hydrocarbon synthesis from CO and $H_2$ (syngas) are known to produce gaseous and liquid hydrocarbons as well as oxygenates which, in general, follow the well-known Anderson-Schulz-Flory product distribution.

These reactions can be carried out in fixed, fluidised or slurry bed reactors. The production of olefins and liquid fuels, especially in the gasoline range products, is most favoured by synthesis carried out in a two-phase fluidised bed reactor operating at 350° C. and 20 bar or higher pressures and usually utilising a fused alkali promoted iron catalyst. This is known as a high temperature Fischer-Tropsch process.

In terms of the ideal Anderson-Schulz-Flory product distribution it is clear that the gasoline ($C_5$ to $C_{11}$) and diesel ($C_{12}$ to $C_{18}$) selectivities are limited to values of about 48% and 25% respectively, while combined liquid fuels selectivity has a maximum value of around 65%. In a high temperature Fischer-Tropsch process performed in a fluidised bed reactor, the optimum liquid fuel yield might not be realised, thus resulting in a lower liquid fuel selectivity. In addition to this relatively low liquid fuel yield, the Fischer-Tropsch process has a further disadvantage in that the product spectrum mainly consists of linear hydrocarbons. This is a disadvantage with respect to gasoline quality, since linear molecules have a very low octane number. Fischer-Tropsch gasoline thus requires either further work-up to convert the product to one with a higher octane number, or the addition of high-octane compounds to the gasoline pool.

It is known that the Fischer-Tropsch product spectrum can be worked-up to high octane gasoline range fuels by using an acidic catalyst such as a zeolite catalyst. Such a work-up has the disadvantage that it adds to the production costs of the liquid fuel.

In order to reduce the above disadvantage it has been attempted to combine a Fischer-Tropsch catalyst with a zeolite catalyst in order to prepare high octane gasoline range fuels directly from CO and $H_2$. In such a system the idea is that the Fischer-Tropsch catalyst should catalyse the conversion of CO and $H_2$ to hydrocarbons, and the acid catalyst should convert the resulting olefinic and oxygenated hydrocarbons to gasoline range products that are highly branched and high in aromatics.

U.S. Pat. Nos. 4,086,262, 4,279,830, 4,361,503, 4,269,783, 4,172,843, 4,463,101, 4,298,695, 4,304,871, 4,556,645, 4,652,538 all disclose the combined use of a hydrocarbon synthesis catalyst and an acidic catalyst in the preparation of hydrocarbons from syngas. The two catalytic functions have been combined in a variety of ways, ranging from a single reactor containing both catalytic functions to a dual reactor arrangement with the two catalytic functions in subsequent reactors. Different reaction conditions and different catalysts are disclosed in these patents.

It is recognised (eg. U.S. Pat. No. 4,298,695) that the addition of alkali promoters to the iron based Fischer-Tropsch catalyst in a bi-functional process (Fischer-Tropsch catalyst and acidic catalyst) is undesirable, since these promoters tend to migrate to the acidic catalyst with a resultant poisoning of the acid sites.

However, it is known that iron based Fischer-Tropsch catalysts with a low alkaline promoter level tend to produce light hydrocarbons that are not desirable for gasoline production since they do not fall in the gasoline range of $C_5$ to $C_{11}$ and are also not easily converted to this range.

Therefore, should a low level of alkali promoter be considered in the production of liquid fuel from syngas, the reaction conditions would be selected to produce a heavier hydrocarbon product despite the low alkali level. It is well-known that a high $H_2$:CO ratio in the feed favours products which are not desirable for gasoline production. Accordingly if a low level of alkali promoter is considered a relatively low $H_2$:CO ratio in the feed will be considered to avoid production of excessively light hydrocarbons.

Surprisingly it has now been found that if hydrocarbon synthesis of syngas is carried out in the presence of a hydrocarbon synthesis catalyst and an acid catalyst under conditions where:

i) the hydrocarbon synthesis catalyst includes a low level of alkali metal; and ii) the hydrogen to carbon monoxide ratio of the syngas feed stream is relatively high, a hydrocarbon product is produced that is suitable for use as gasoline. This is true even if the synthesis is carried out under high temperature Fischer-Tropsch conditions.

DISCLOSURE OF THE INVENTION

According to the present invention there is provided a hydrocarbon synthesis process comprising the conversion of a feed of $H_2$ and at least one carbon oxide to hydrocarbons containing at least 30% on a mass basis hydrocarbons with five or more carbon atoms (hereinafter referred to as $C_{5+}$ compounds), the conversion being carried out in the presence of an alkali-promoted iron hydrocarbon synthesis catalyst and an acidic catalyst suitable for converting hydrocarbons; and the process being characterised therein that the reaction mixture formed during the conversion contains less than 0.02 mol alkali metal per 100 g iron and that the $H_2$:carbon oxide molar ratio in the feed of $H_2$ and carbon oxide is at least 2.

The synthesised hydrocarbons preferably contain, on a mass basis, at least 35%, more preferably at least 40% and most preferably at least 50%, $C_6^+$ compounds. Preferably, the process is for producing liquid fuel, especially gasoline and preferably unleaded gasoline. The process may also be used for producing hydrocarbons rich in aromatics such as benzene, toluene and xylenes and/or hydrocarbons rich in branched hydrocarbons and/or rich in olefins.

The hydrocarbon synthesis process may comprise a Fischer-Tropsch process, preferably a high temperature Fisher-Tropsch process. The temperature range may be between 250° C. and 400° C., typically from 300° C. to 370° C., and even from 330° C. to 350° C. The pressure may be from 10 to 60 bar (1 to 6 MPa), typically from 15 to 30 bar, and usually at about 20 bar.

The at least one carbon oxide in the syngas preferably comprises CO. The carbon oxide may comprise a mixture of CO and $CO_2$.

The reaction may be carried out in any suitable reactor. It is foreseen that it will be carried out in a fluidised bed reactor, preferably in a fixed fluidised bed reactor. If the CO hydrogenation (hydrocarbon synthesis) catalyst and the acidic catalyst are contained on separate particles, the invention especially suited to a fluidised bed reactor, since there will not be extensive direct contact between the different catalysts which will reduce migration of the alkali promoters from the hydrocarbon synthesis catalyst to the acidic catalyst, thereby reducing the detrimental results associated with such migration.

The hydrocarbon synthesis catalyst may comprise any suitable alkali-promoted iron catalyst suitable for CO hydrogenation but preferably it comprises a Fischer-Tropsch catalyst. The iron catalyst preferably comprises a precipitated iron catalyst, but it may also comprise a fused iron catalyst. It the process is to be performed in a fluidised bed reactor, the final catalyst may be produced by means of a variety of known methods in order to obtain particles with acceptable fluidisation properties, such as crushing, spray-drying, etc. In order to obtain a particle size distribution suitable for fluidisation, the catalyst may be classified by means of known methods, such as sieving, cyclone classification, etc.

The iron catalyst contains at least one alkali promoter usually if the form of an alkali oxide. The alkali promoter preferably comprises potassium or sodium oxide. The catalyst may contain more than one alkali promoter. The alkali can be added to the iron by means various methods, such as impregnation of the iron with the alkali, co-precipitating the alkali with the iron, fusing the iron and the alkali, etc. The total alkali metal content (mol alkali metal per 100 g iron) must preferably be below 0.02, more preferably below 0.01, and most preferably below 0.005.

The iron catalyst may also contain other promoters. Certain promoters, for example Al, Ti, Cr, Mg, Mn and Ca can be added as structural promoters to the iron catalyst. Binders, such as silica or alumina, may also be added in case of a spray-dried catalyst.

The acidic catalyst may comprise a zeolite. The zeolite may comprise a HZSM-5 zeolite. If the process is to be performed in a fluidised bed, the final acid catalyst may be prepared in any suitable known way in order to obtain particles with acceptable fluidisation properties. For example, the acid catalyst may be a spray-dried catalyst. A binder (such as silica or alumina) may also be added to the acidic catalyst.

The silica/alumina ratio of the zeolite can be varied according to the product spectrum desired and the lifetime required for the catalyst.

The hydrocarbon synthesis catalyst and the acidic catalyst may be combined in a variety of ways. It is foreseen that in a preferred embodiment of the invention the two catalysts will be contained on separate particles and preferably contact between the particles containing the different catalysts should be limited. This will reduce migration of the alkali promoter to the acidic catalyst. However, it is foreseen that it may also be possible to combine the two catalysts into particles containing both catalytic functions. For example, the two catalysts may be pressed into pellets or spray-dried to produce particles that contain both catalytic functions. The hydrocarbon synthesis catalyst may also be supported by the acidic catalyst. The iron may be loaded onto the acidic catalyst by means of a variety of art-recognised methods, such as precipitation, impregnation, chemical vapour deposition, ion exchange, etc.

The ratio (by mass) of hydrocarbon synthesis catalyst to acidic catalyst is preferably at least 1.

The $H_2$ and carbon oxide feed is known as synthesis feed gas (or syngas) and it may also include other components, such as water vapour, Ar, $CH_4$, light hydrocarbons, etc.

The $H_2$:carbon oxide molar ratio may be as low as possible at or above the ratio of 2. However it may be higher e.g. 2.2 and even as high as 2.6; 2.7; 4.4; 4.5, 4.9; 5.0; and 5.8.

The hydrocarbon products of the process may comprise mainly of branched paraffins and olefins, cyclic paraffins and olefins, and aromatics, but linear paraffins and olefins may also be present in the product spectrum.

The invention also relates to hydrocarbons produced by the process substantially as described hereinabove.

The invention will now be further described by means of the following non-limiting examples.

EXAMPLE A

Catalysts

A fused iron catalyst containing low levels of alkali was employed as the syngas ($H_2$ and carbon oxide) conversion catalyst. The catalyst was prepared by adding the relevant promoters to oxidised mill-scale to obtain a dry mixture of the precursor material. This mixture was then fused in an electric arc furnace at a temperature of about 1650° C. The molten material was cast as ingots. After cooling, the ingots were crushed, milled and then sieved to obtain a particle size fraction of 38 to 150 micron. The composition of the catalyst is presented in Table 1.

TABLE 1

| Composition of fused iron catalyst | |
|---|---|
| Component | Concentration |
| Fe (mass %) | 70.8 |
| K (mol/100 g Fe) | 0.0064 |
| Na (mol/100 g Fe) | 0.0113 |
| $SiO_2$ (g/100 g Fe) | 0.78 |
| $Al_2O_3$ (g/100 g Fe) | 0.32 |

Both K and Na were in the form of their oxides namely $K_2O$ and $Na_2O$.

The acidic catalysts comprised a "high alumina content" HZSM-5 zeolite ($SiO_2/Al_2O_3$ molar ratio of 30) and a "low alumina content" HZSM-5 zeolite ($SiO_2/Al_2O_3$ molar ratio of 280) supplied by Zeolyst International. The Zeolyst International product numbers of the zeolites are CBV3024E and CBV28014 for the "high alumina content" and "low alumina content" ZSM-5 zeolites, respectively. The zeolites were in a powdered form and were used as such for the purpose of the microreactor experiments. The zeolites were supplied in the ammonium form ($NH_4ZSM-5$) and prior to use they were calcined in air at a temperature of 500° C. for 16 hours to convert them to the acidic form (HZSM-5).

Reactor System

A Berty microreactor was used. The catalyst inside a Berty microreactor is contained in a very thin bed. A fan, situated below this bed, circulates gas through the catalyst at a high rate. The reactor can therefore essentially be viewed as a short packed bed with an extremely high recycle ratio, and thus behaves approximately like a continuous stirred tank reactor (CSTR). Since the gas circulation through the catalyst ensures that there are no significant temperature or concentration profiles across the bed, this reactor is ideal for studying the highly exothermic high temperature Fischer-Tropsch (HTFT) reaction. It will be appreciated that a Berty microreactor is considered as a very good simulation of a fluidised bed reactor.

The main component of the Berty reactor feed during the examples was a commercial synthesis gas stream. Pure hydrogen and carbon dioxide were co-fed from bottles in order to obtain a total syngas feed to the Berty reactor that was rich in hydrogen. In addition, bottled argon was fed to the reactor, which served as an internal standard. The flow rates of the four feed streams were controlled by Brooks mass flow controllers. The composition of the total Berty feed is presented in Table 2.

TABLE 2

Feed stream composition of Berty reactor experiments (volume %)

| Component | Volume % |
|---|---|
| $H_2$ | 58 |
| CO | 12.5 |
| $CO_2$ | 12 |
| $CH_4$ | 5.5 |
| Ar | 12 |

It will be appreciated that the above volume percentages are substantially the same as molar percentages since the gasses were at the same pressure.

The effluent from the Berty reactor was passed through a two-stage knock-out system. In the first pot (hot knock-out pot), waxy hydrocarbons were condensed. The amount of product drained from this pot, if any, was negligible. A second pot (cold knock-out pot) condensed the condensable hydrocarbons and reaction water, while the uncondensed effluent flowed to a vent system. The product sampling point was situated before the cold knock-out pot to ensure that a sample was taken of the comprehensive product spectrum. Samples were taken in glass ampoules for later GC analysis. The hydrocarbon product spectrum was characterised by means of a GC-FID analysis.

Loading of the Reactor

At the start of the experimental investigation, a baseline high temperature Fischer-Tropsch run was performed under the same conditions (including catalyst activation) as for the bi-functional catalyst but with 5 g of iron catalyst (unreduced weight) as the only catalyst.

The process runs according to the invention were performed with 5 g of iron catalyst (unreduced weight) and 5 g of "high alumina content" HZSM-5 zeolite in the one case and 5 g of iron catalyst (unreduced weight) and 5 g of "low alumina content" HZSM-5 zeolite in the other case. In both cases an iron catalyst layer was loaded on top of a zeolite layer and the layers were separated by a fine wire mesh thereby avoiding contact between the catalysts. It will be appreciated that the catalysts were present at the same time in the same reactor.

Catalyst Activation and Synthesis

The zeolites did not require any additional activation. The iron catalyst was reduced with a hydrogen feed of 1000 ml/min for 16 hours at a temperature of 420° C. prior to synthesis. Thereafter, the temperature was lowered to 330° C. under a combined feed of argon and hydrogen. After the temperature had stabilised, synthesis commenced by setting all the mass flow controllers to the desired values in order to obtain the total feed composition presented in Table 2 at a total flow rate of 1500 ml/min. During reduction and synthesis, the total reactor pressure was maintained at 20 bar.

Results

The results of the experiments are presented in Table 3. The product obtained from the process contains a vast number of components. However, only certain compounds that were unambiguously identified were presented to illustrate the benefits of combining an iron catalyst and an acid catalyst according to the invention.

TABLE 3

Results

| | Experiment | | |
|---|---|---|---|
| | Baseline FT run | Bifunctional process run | Bifunctional process run |
| Catalyst(s) | Iron catalyst | Iron catalyst + "high Al content" HZSM-5 | Iron catalyst + "low Al content" HZSM-5 |
| Time on line [h] | 22 | 6 | 5 |
| ($H_2$ + CO) conversion [mol %] | 46.3 | 28 | 42.9 |
| (CO + $CO_2$) conversion [mol %] | 39.7 | 29.6 | 37.8 |
| Hydrocarbon product distribution [mass %] | | | |
| $C_1$ | 11.6 | 16.8 | 15.4 |
| $C_2$ | 10.9 | 5.5 | 5.8 |
| $C_3$ | 16.8 | 11.8 | 8.2 |
| $C_4$ | 12.8 | 16.8 | 15.7 |
| $C_5^+$ | 47.9 | 49.1 | 54.9 |
| $C_5$ to $C_{11}$ fraction | 40.7 | 43.6 | 53.1 |
| BTXE aromatics selectivity* | 0.8 | 14.8 | 7.8 |
| Aromatic content of $C_6$-$C_8$ product fraction [mass %] | 3.6 | 70.9 | 28 |
| Linear $C_5$ paraffins/branched $C_5$ paraffins [mass/mass] | 0.88 | 0.22 | 0.45 |
| Linear $C_6$ paraffins/branched $C_6$ paraffins [mass/mass] | 2.24 | 0.14 | 0.36 |

TABLE 3-continued

Results

| | Baseline FT run | Bifunctional process run Catalyst(s) | Bifunctional process run |
|---|---|---|---|
| | Iron catalyst | Iron catalyst + "high Al content" HZSM-5 | Iron catalyst + "low Al content" HZSM-5 |
| Linear $C_5$ olefins/branched $C_5$ olefins [mass/mass] | 4.21 | 0.31 | 0.32 |
| Linear $C_6$ olefins/branched $C_6$ olefins [mass/mass/ | 2.75 | 0** | 0.17 |

*This refers to the mass percentage of all the $C_6$ to $C_8$ aromatics in the total hydrocarbon product spectrum
**Due to the small amounts of linear $C_6$ olefins present in the product, these compounds were not detected by the GC-analysis From the results it is clear that the process according to the invention produced a substantial amount of condensable hydrocarbons, even though the syngas feed to the reactor was rich in hydrogen arid the alkali metal content of the iron catalyst was low. The $C_5^+$ selectivity was about 50% for both examples of the process according to the invention.

It is further clear that the addition of an acidic catalyst to be Fischer-Tropsch process increased the selectivity of the condensable hydrocarbons. The selectivity of the $C_5^+$ hydrocarbons increased significantly, especially in the case of the "low alumina content" HZSM-5. The increase in the $C_5$ to $C_{11}$ fraction, which contains most of the gasoline range components, was even more substantial.

The results also indicate that the normal Fischer-Tropsch product consists mainly of linear hydrocarbons and contains little aromatic and branched compounds. Since linear hydrocarbons have a very low octane value, they are undesirable as gasoline components. By adding an acid catalyst to the process, the amount of aromatics in the product increased dramatically and the paraffins and olefins became substantially more branched. These effects are especially noted for the case of the "high alumina content" HZSM-5.

The examples presented therefore clearly illustrate that the addition of an acidic catalyst to the Fischer-Tropsch process not only increases the selectivity of compounds that fall inside the gasoline range, but also that an improved gasoline fraction, containing substantially higher amounts of high octane value compounds such as aromatics, branched paraffins and branched olefins, is produced.

EXAMPLE B

The additional examples are intended to demonstrate that the requirement that the $C_5+$ hydrocarbon fraction of at least 30 mass % is satisfied at the extremes of the alkali metal content range (0.005 to 0.01 mol alkali metal/100 g Fe). It is also intended to demonstrate that this requirement is also satisfied at high hydrogen to carbon oxide ratios in the syngas.

Catalysts

Precipitated iron catalysts containing varying levels of alkali were employed as the syngas conversion catalyst. The catalysts were prepared by reverse precipitation. For each preparation approximately 170 ml 25% aqueous ammonium hydroxide ($NH_4OH$) solution was added to 400 ml of an 1 M aqueous solution of iron nitrate ($Fe(NO_3)_3 \cdot 9H_2O$) while stirring. Precipitation was allowed to occur until a pH of 7. A 0.005 M potassium carbonate ($K_2CO_3$) or sodium carbonate ($Na_2CO_3$) solution was added to the precipitate in appropriate amounts to achieve the desired concentration of promoter in each catalyst. The precipitate was dried at 130° C. overnight, and calcined at 350° C. for four hours. The compositions of the catalysts are presented in Table 4.

TABLE 4

Composition of precipitated iron catalysts

| Catalyst | Fe (mass %) | K (mol/100 g Fe) | Na (mol/100 g Fe) |
|---|---|---|---|
| PS01 | 68.9 | 0.0045 | 0 |
| PS02 | 68.7 | 0 | 0.0045 |
| PS03 | 69.4 | 0.009 | 0 |
| PS04 | 69.0 | 0 | 0.009 |

Both K and Na were in the form of their oxides namely $K_2O$ and $Na_2O$.

The acidic catalyst comprised a "high alumina content" HZSM-5 zeolite ($SiO_2/Al_2O_3$ molar ratio of 30) supplied by Zeolyst International. The Zeolyst International product number of the zeolite is CBV3024E. The zeolite was in a powdered form and was used as such for the purpose of the microreactor experiments. The zeolite was supplied in the ammonium form ($NH_4ZSM$-5) and prior to use it was calcined in air at a temperature of 500° C. for 16 hours to convert it to the acidic form (HZSM-5).

Reactor System

The reactor system was as described for examples A.

The feed composition to the reactor was similar to the feed composition for examples A (Table 2), but individual gas flow rates were varied to achieve different hydrogen to carbon oxide ratios. The variation in the individual gas flow rates also caused slight variations in the total gas flow rate. The feed composition and total gas flow rate for each run is given in Table 5.

TABLE 5

Gas feed flow rate and composition for different experimental runs

| Run no. | Total gas flow rate (ml/min) | $H_2/(CO + CO_2)$ volume ratio | $H_2$ (vol. %) | CO (vol. %) | $CO_2$ (vol. %) | $CH_4$ (vol %) | Ar (vol %) |
|---|---|---|---|---|---|---|---|
| 1 | 1476 | 2.7 | 60.3 | 13.8 | 8.3 | 5.3 | 12.2 |
| 2 | 1381 | 4.5 | 66.3 | 14.4 | 0.3 | 5.9 | 13.1 |
| 3 | 1498 | 2.7 | 60.4 | 13.0 | 9.4 | 5.2 | 12.0 |

TABLE 5-continued

Gas feed flow rate and composition for different experimental runs

| Run no. | Total gas flow rate (ml/min) | $H_2/(CO + CO_2)$ volume ratio | $H_2$ (vol. %) | CO (vol. %) | $CO_2$ (vol. %) | $CH_4$ (vol %) | Ar (vol %) |
|---|---|---|---|---|---|---|---|
| 4 | 1335 | 4.5 | 66.1 | 14.2 | 0.4 | 5.8 | 13.5 |
| 5 | 1590 | 5.8 | 71.4 | 12.0 | 0.3 | 4.9 | 11.3 |
| 6 | 1486 | 2.6 | 59.5 | 13.4 | 9.7 | 5.3 | 12.1 |
| 7 | 1353 | 4.4 | 65.9 | 14.6 | 0.4 | 5.8 | 13.3 |
| 8 | 1449 | 4.9 | 68.2 | 13.6 | 0.3 | 5.5 | 12.4 |
| 9 | 1507 | 2.6 | 59.6 | 13.2 | 10.0 | 5.3 | 12.0 |
| 10 | 1365 | 4.4 | 66.1 | 14.5 | 0.4 | 5.9 | 13.2 |
| 11 | 1474 | 5.0 | 68.8 | 13.3 | 0.4 | 5.4 | 12.2 |

It will be appreciated that since the $H_2$, CO and $CO_2$ were at the same pressure $H_2/(CO+CO_2)$ will be the same whether it is expressed as volume or moles.

The effluent knock-out, sampling and analysis were as for examples A.

Loading of the Reactor

The reactor was loaded as for examples A.

Catalyst Activation and Synthesis

Activation and synthesis conditions were as for examples A.

Results

The results are presented in Table 6.

TABLE 6

The Influence of alkali metal level and hydrogen/carbon oxide ratio on the selectivity for $C_6$+ (mass %)

| Catalyst No. | Alkali | Alkali metal Concentration (mol/100 g Fe) | Run no. | $H_2/(CO + CO_2)$ ratio | $C_5$+ selectivity (mass %) |
|---|---|---|---|---|---|
| PS01 | K | 0.0045 | 1 | 2.7 | 41 |
|  |  |  | 2 | 4.5 | 32 |
| PS02 | Na | 0.0045 | 3 | 2.7 | 43 |
|  |  |  | 4 | 4.5 | 35 |
|  |  |  | 5 | 5.8 | 30 |

TABLE 6-continued

The Influence of alkali metal level and hydrogen/carbon oxide ratio on the selectivity for $C_6$+ (mass %)

| Catalyst No. | Alkali | Alkali metal Concentration (mol/100 g Fe) | Run no. | $H_2/(CO + CO_2)$ ratio | $C_5$+ selectivity (mass %) |
|---|---|---|---|---|---|
| PS03 | K | 0.009 | 6 | 2.6 | 53 |
|  |  |  | 7 | 4.4 | 46 |
|  |  |  | 8 | 4.9 | 41 |
| PS04 | Na | 0.009 | 9 | 2.6 | 56 |
|  |  |  | 10 | 4.4 | 49 |
|  |  |  | 11 | 5.0 | 45 |

It is clear that at alkali metal levels between 0.0045 and 0.009 mol alkali metal/100 g Fe, and at hydrogen to carbon oxide feed ratios of up to 5 or more the requirement of >30% $C_5$+ selectivity is satisfied.

The invention claimed is:

1. A Fischer-Tropsch process comprising converting a feed of $H_2$ and at least one carbon oxide to hydrocarbons in the presence of an alkali metal promoted iron Fischer-Tropsch catalyst and an acidic catalyst suitable for converting hydrocarbons, wherein a reaction mixture formed during the conversion contains less than 0.02 mol alkali metal per 100 g iron and the $H_2$:carbon oxide molar ratio in the feed of $H_2$ and carbon oxide is at least 2.

2. The process of claim 1 wherein the hydrocarbons obtained contain at least 40% on a mass basis of hydrocarbons with five or more carbon atoms.

3. The process of either one of claims 1 or 2 wherein the process is a high temperature Fischer-Tropsch process.

4. The process of claim 1 wherein the at least one carbon oxide is CO.

5. The process of claim 1 wherein the promoter comprises potassium or sodium oxide.

6. The process of claim 1 wherein the acidic catalyst comprises a zeolite.

7. The process of claim 6 wherein the zeolite comprises a HZSM-5 zeolite.

8. The process of claim 1 wherein the Fischer-Tropsch catalyst and the acidic catalyst are contained on separate particles.

* * * * *